United States Patent [19]

Hamabata

[11] Patent Number: 5,775,030
[45] Date of Patent: Jul. 7, 1998

[54] SEALING STRUCTURE FOR AN INNER SIDE OF A DOOR GLASS IN A DOOR OF AN AUTOMOBILE

[75] Inventor: Mitsuo Hamabata, Nakashima-gun, Japan

[73] Assignee: Toyoda Gosei Co., Ltd., Aichin-ken, Japan

[21] Appl. No.: 588,843

[22] Filed: Jan. 19, 1996

[30] Foreign Application Priority Data

Jan. 26, 1995 [JP] Japan ................................ 7-031450

[51] Int. Cl.⁶ ........................................... B06J 1/16
[52] U.S. Cl. ............................................... 49/377
[58] Field of Search ........................... 49/377, 492.1, 49/495.1; 296/153

[56] References Cited

U.S. PATENT DOCUMENTS

| 4,949,507 | 8/1990 | Vaughan | 49/377 |
| 5,004,292 | 4/1991 | Horne | 49/377 |
| 5,085,005 | 2/1992 | Yasukawa et al. | 49/377 |
| 5,170,586 | 12/1992 | Ose et al. | 49/377 |
| 5,207,027 | 5/1993 | Larsen | 49/377 |
| 5,311,702 | 5/1994 | Moore | 49/475.1 |
| 5,463,831 | 11/1995 | Shinagawa et al. | 49/377 |
| 5,544,448 | 8/1996 | Mass | 49/377 |

FOREIGN PATENT DOCUMENTS

| 3816347 | 11/1989 | Germany | 49/495.1 |
| 63-072259 | 5/1988 | Japan . | |
| 63-134813 | 9/1988 | Japan . | |

*Primary Examiner*—Kenneth J. Dorner
*Assistant Examiner*—Curtis Cohen
*Attorney, Agent, or Firm*—Cushman Darby & Cushman IP Group of Pillsbury Madison & Sutro LLP

[57] ABSTRACT

A sealing structure for sealing an inner side of a door glass in a door of an automobile includes a door trim having a downwardly extending trim flange facing toward the door glass; an inner door panel disposed adjacent the door trim with a clearance therebetween, the inner door panel having a downwardly extending panel flange facing the trim flange; an inner weather strip attached to the trim flange to form a seal between the door glass and the door trim; and an air sealing portion protruding from a lower edge of the inner weather strip. At least a part of the air sealing portion contacts the downwardly extending panel flange to shut-off or reduce air flow through the clearance.

9 Claims, 5 Drawing Sheets

SEALING STRUCTURE FOR AN INNER SIDE OF A DOOR GLASS IN A DOOR OF AN AUTOMOBILE

The priority document, Japanese Patent Application No. 7-31450, filed in Japan on Jan. 26, 1995, is hereby incorporated by reference into the present specification.

BACKGROUND OF THE INVENTION

1. Field of the Invention

This invention relates to a sealing structure for an inner edge of an opening in a door of an automobile through which a door glass can be raised and lowered.

2. Description of Related Art

FIG. 7 shows a door of an automobile having an opening through which its door glass 20 can be raised and lowered. The door is provided on the outer side of the door glass 20 with an outer weather strip 30 attached as a door belt molding to an outer door panel 35, as shown in FIG. 8. On the inner side of the door glass 20, the door is provided with a decorative door trim 21 and a reinforcing panel 23 attached to an inner surface at the door trim 21. The door trim 21 and the reinforcing panel 23 are curved in an inverted U-shaped form, defining a downwardly extending trim flange 22 facing toward the door glass 20. An inner door panel 25 disposed adjacent the door trim 21 with a clearance 17 therebetween, is also curved in an inverted U-shaped form defining a downwardly extending panel flange 26 facing the trim flange 22. An inner weather strip 50 provides a seal between the door glass 20 and the door trim 21.

The inner weather strip 50 comprises a generally planar attachment portion 51 attached to the trim flange 22, and a door glass sealing portion 52 projecting from the attachment portion 51, contacting the door glass 20 and having a tongue-shaped cross-section. The two portions 51 and 52 are formed as a single extrusion molded product of a synthetic resin, or rubber. The attachment portion 51 has a metal insert 53 embedded therein.

It has, however, been found that, although the inner weather strip 50 provides a satisfactory seal for the door glass 20, the presence of the clearance 17 between the door trim 21 and the inner door panel 25 gives rise to the following problem. When a difference in air pressure exists between the inside and outside of the automobile, as when a negative pressure is produced outside the automobile which is running at a high speed, or when the use of an air conditioner results in an elevated pressure prevailing inside the automobile, the air inside the automobile flows through the clearance 17 and blows-out through an opening 18 between the lower edges of the trim and panel flanges 22 and 26, as shown by arrows in FIG. 8. The air blowing-out through the opening 18 is likely to make a sound like that of a whistle, thereby giving a feeling of disorder to the passenger of the automobile and making the automobile less comfortable.

SUMMARY OF THE INVENTION

It is, therefore, an object of this invention to provide a sealing structure for the inner side of a door glass in a door of an automobile which can prevent sound, like that of a whistle, from being generated at the inner side of the door glass by a difference in the air pressure between the inside and the outside of the automobile, or can at least reduce any such sound to an inaudible level.

This object is attained by providing a sealing structure which comprises a door trim having a downwardly extending trim flange facing toward the door glass in a door of an automobile, an inner door panel disposed adjacent the door trim with a clearance therebetween and having a downwardly extending panel flange facing the trim flange, and an inner weather strip attached to the trim flange to form a seal between the door trim and the door glass and having an air sealing portion protruding from its lower edge to shutoff, or reduce the flow of air through the clearance between the door trim and the inner door panel.

The air sealing portion may, for example, be an elastically flexible air sealing piece having a tongue-shaped cross-section, extending below the trim flange and making elastic contact with the panel flange. The air sealing piece preferably protrudes upwardly from the lower edge of the inner weather strip.

If any difference in air pressure exists between the inside and outside of the automobile, the sealing structure of this invention prevents sound, like that of a whistle, from generating at the inner side of the door glass, or reduces the sound to an inaudible level, since the air sealing portion at the lower edge of the inner weather strip shuts-off, or reduces the flow of air through the clearance between the door trim and the inner door panel.

If the air sealing portion is an elastically flexible air sealing piece, its elastic contact with the panel flange enables the flow of air through the clearance to be shut-off. If this air sealing piece protrudes upwardly from the lower edge of the inner weather strip, it has an improved sealing property, since the air which tends to flow from the inside of the automobile toward its outside through the clearance flows downwardly, or in the opposite direction to the upwardly protruding air sealing piece, between the trim and panel flanges. Thus, the air acts to press the air sealing piece even more tightly against the panel flange.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

DETAILED DESCRIPTION OF THE PREFERRED EMBODIMENTS

Figure 1:
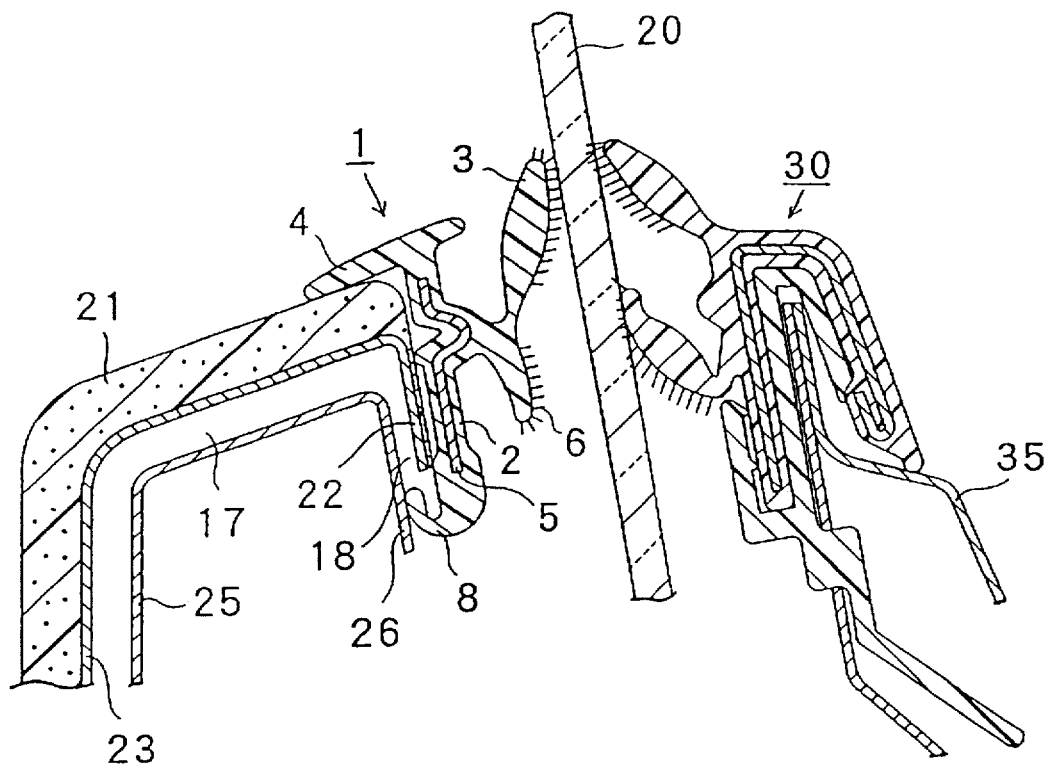
FIG. 1 is a sectional view of a sealing structure embodying the invention and used for sealing an inner side of a door glass in a door of an automobile.
Figure 2:
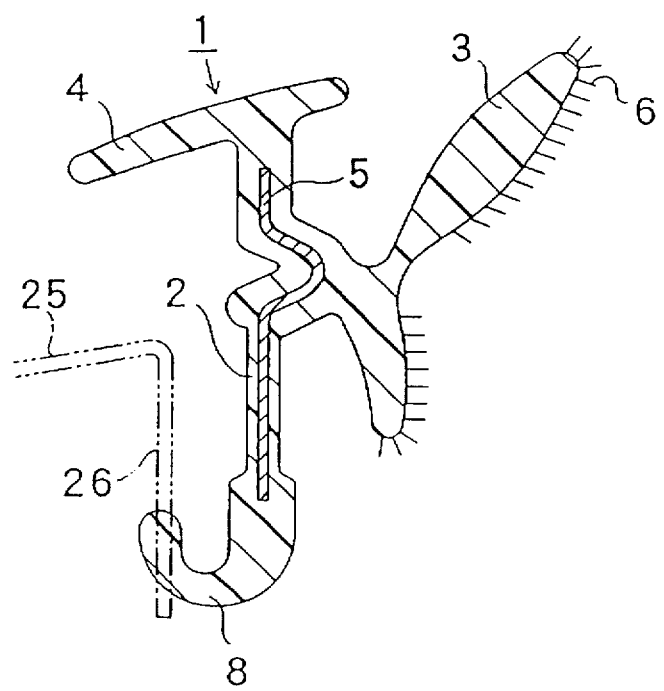
FIG. 2 is an enlarged sectional view of an inn weather strip employed in the sealing structure FIG. 1.
Figure 7:
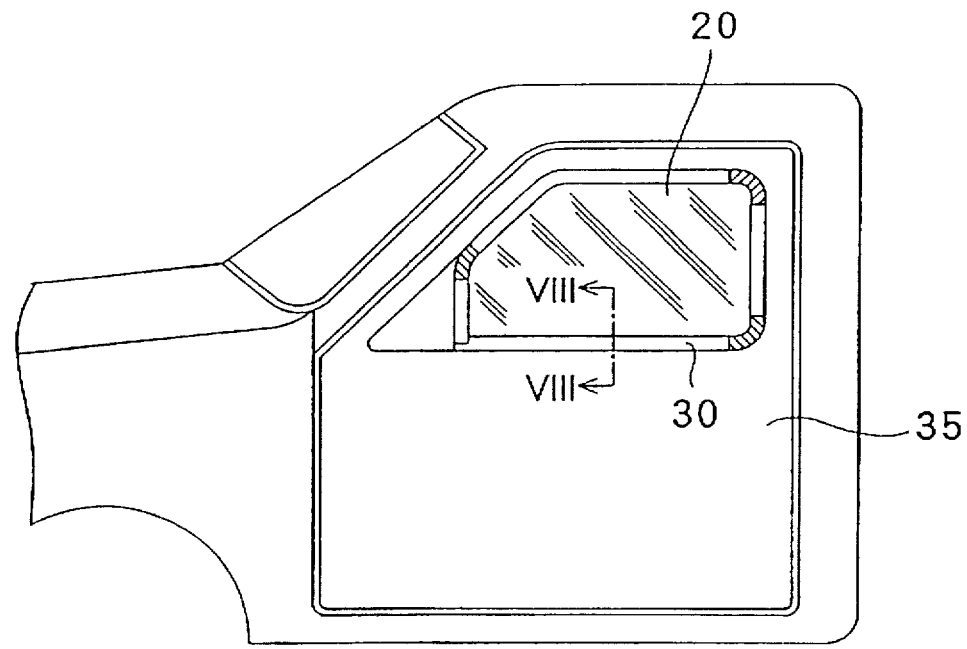
FIG. 7 is a side elevational view of a part of an automobile including a door.
Figure 8:
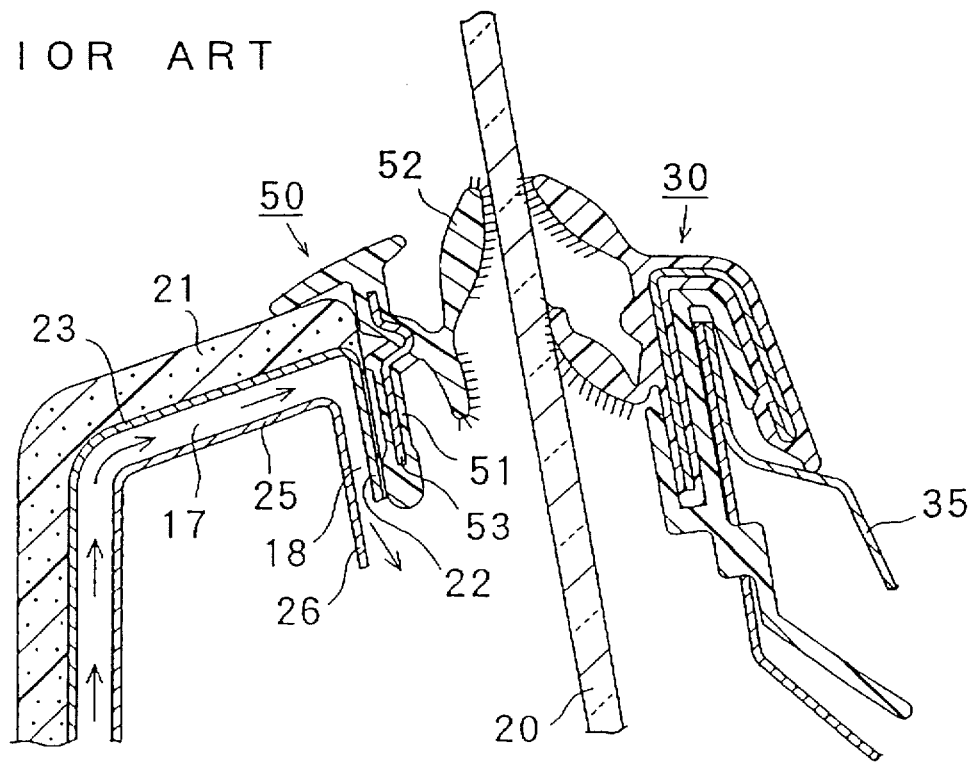
FIG. 8 is a sectional view taken along the line VIII—VIII of FIG. 7 showing the conventional sealing structure for the inner side of the door glass.

Description will now be made of a sealing structure embodying the invention with reference to FIGS. 1 to 4. The structure is applied to a door of an automobile as shown in FIG. 7, and as described in connection with the conventional structure shown in FIG. 8. Although the door has an outer weather strip 30 attached as a door belt molding to an outer door panel 35 on the outer side of a door glass 20, as shown in FIG. 1, no further description of the outer weather strip 30 is made, since it does not form a part of this invention.

On the inner side of the door glass 20, the door is provided with a decorative door trim 21 preferably of a synthetic resin. The door trim 21 and a reinforcing panel 23, formed from a sheet of metal, wood, synthetic resin and the like on its inner surface, are curved in an inverted U-shaped form, defining a downwardly extending trim flange 22 facing the door glass 20. An inner door panel 25 formed from a sheet of metal is disposed adjacent the door trim 21 with a clearance 17 therebetween. The inner door panel 25 is also curved in an inverted U-shaped form defining a downwardly extending panel flange 26 facing the trim flange 22. An inner weather strip 1 provides a seal between the door glass 20 and the door trim 21.

The inner weather strip 1 comprises a generally planar attachment portion 2 attached to the trim flange 22, a door glass sealing portion 3 projecting from a curved middle part of the attachment portion 2 to the door glass 20, contacting the door glass 20 and having a tongue-shaped cross-section, a cover lip portion 4 projecting inwardly from the upper edge of the attachment portion 2 and contacting the top of the door trim 21, and an air sealing piece 8 protruding inwardly and upwardly from the lower edge of the attachment portion 2 and contacting the panel flange 26. The portions 2, 3, 4 and 8 are formed by extrusion molding from a synthetic resin, such as PVC (polyvinyl chloride), or rubber, such as EPDM (ethylene-propylene-diene copolymer) to form the inner weather strip 1 as a single product. The attachment portion 2 has an insert member 5 formed from metal or hard synthetic resin embedded therein. Flocked piles 6 are bonded by an adhesive to that surface of the door glass sealing portion 3 with which the door glass 20 is slidably in contact.

The air sealing piece 8 is an elastically flexible one shaped like a tongue and having a U-shaped cross-section. The sealing piece 8 extends below the trim flange 22 and elastically contacts the outer surface of the panel flange 26 to close an opening 18 between the lower edges of the trim and panel flanges 22 and 26.

Figure 3:
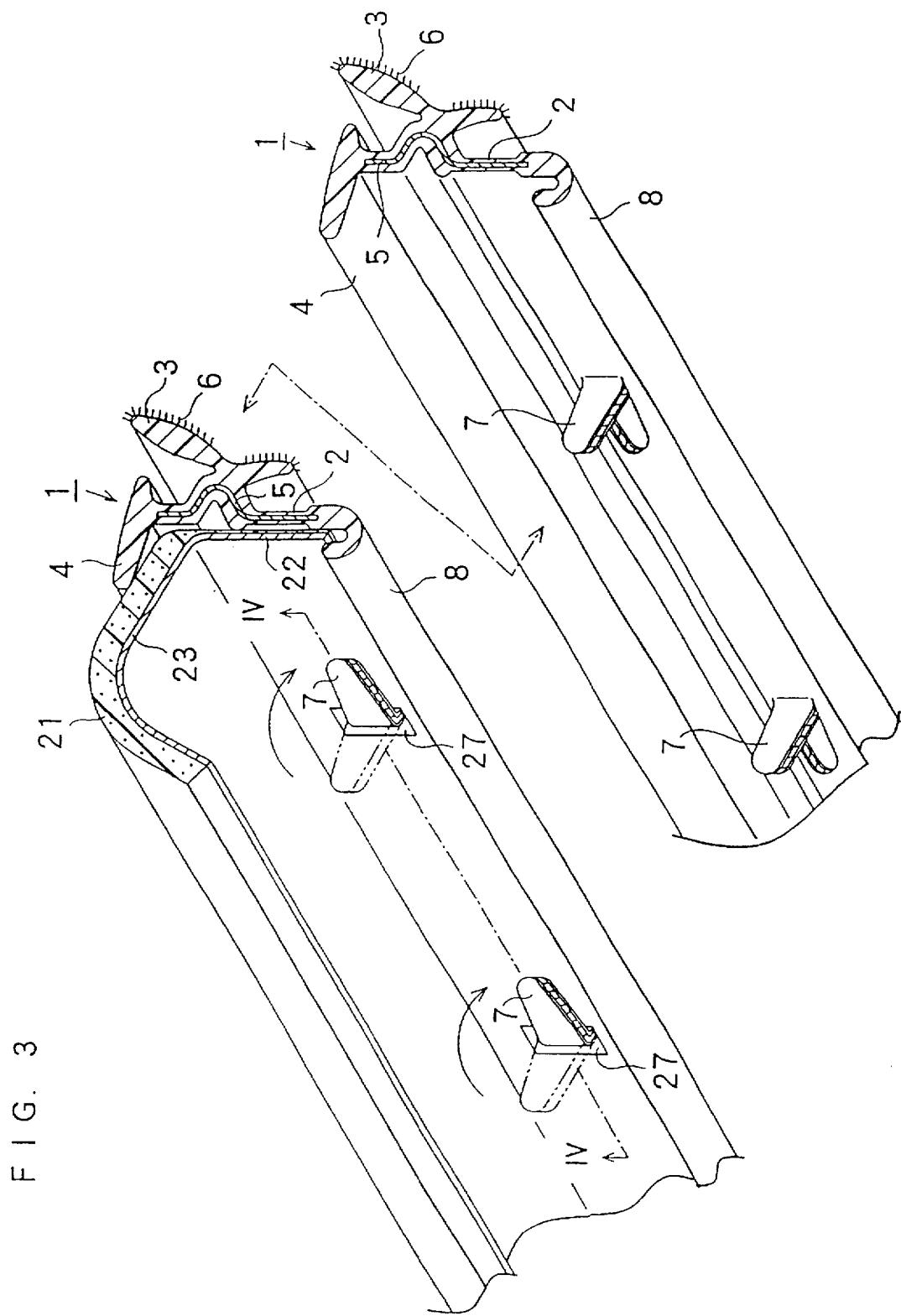
FIG. 3 is a fragmentary perspective view of the sealing structure of FIG. 1.
Figure 4:
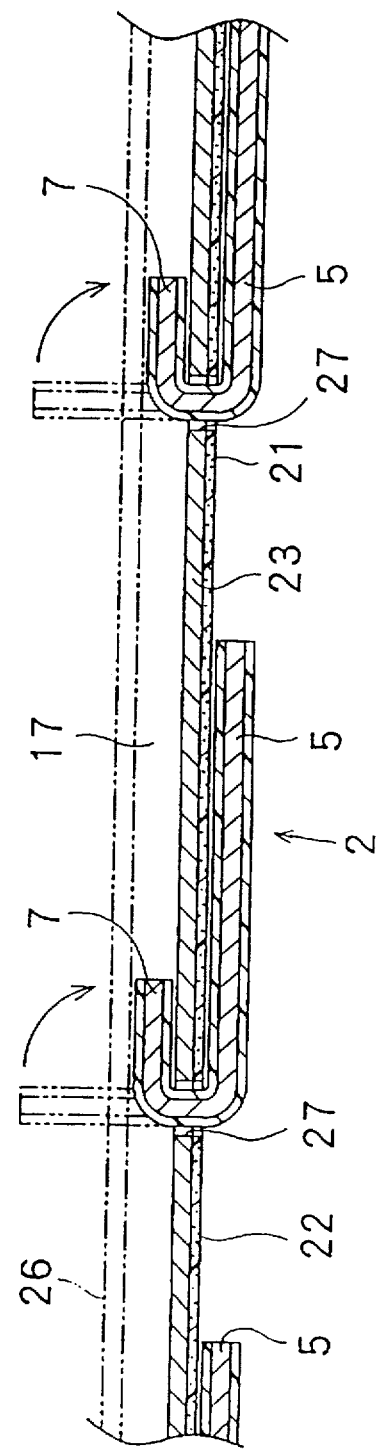
FIG. 4 is a sectional view taken along the line IV—IV of FIG. 3.

The inner weather strip 1 has a plurality of pawls 7 each formed by raising a part of the attachment portion 2 including the insert member 5 away from a generally U-shaped slit, while the trim flange 22 has a plurality of holes 27. Each pawl 7 extends through one of the holes 27 and is bent over the trim flange 22, as shown in FIGS. 3 and 4, whereby the inner weather strip 1 is attached to the trim flange 22.

The sealing structure as described above prevents any sound, like that of a whistle, from being generated at the inner side of the door glass 20 as a result of any difference occurring in air pressure between the inside and outside of the automobile. The air sealing piece 8 maintains elastic contact with the outer surface of the panel flange 26 and shuts-off the flow of air through the clearance 17 between the door trim 21 and the inner door panel 25. The air sealing piece 8 has an improved sealing property, since it protrudes upwardly from the lower edge of the inner weather strip 1. This improved sealing property is due to the fact that the air which tends to flow from the inside of the automobile toward the outside thereof through the clearance 17 flows downwardly, or in the opposite direction to the upwardly protruding air sealing piece 8, between the trim and panel flanges 22 and 26 and acts to press the air sealing piece 8 tightly against the panel flange 26.

Figure 5:
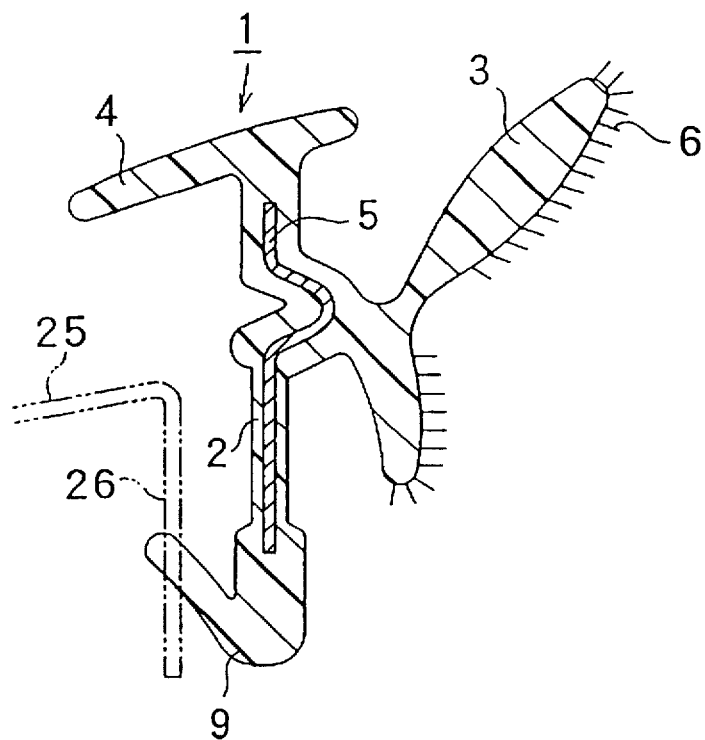
FIG. 5 is a sectional view of a modified form of inner weather strip.
Figure 6:
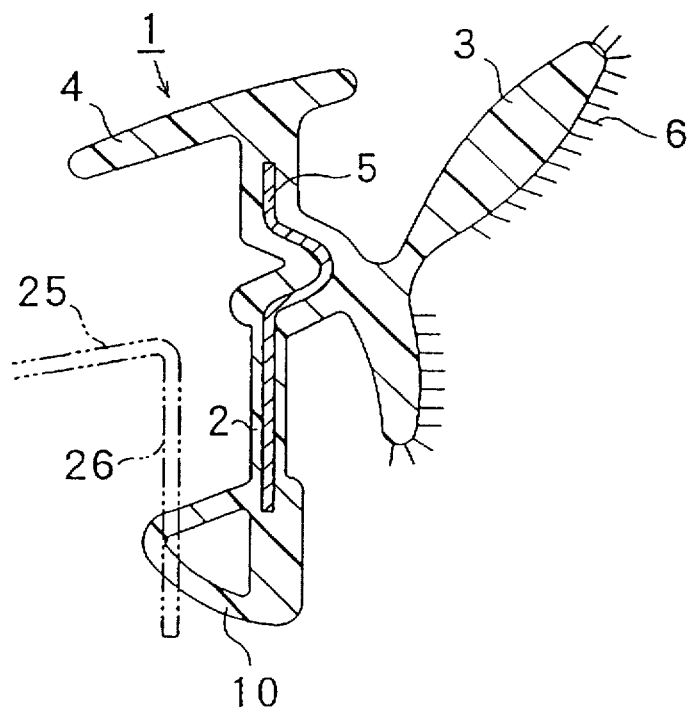
FIG. 6 is a sectional view of another modified form of inner weather strip.

It is to be understood that the foregoing description of the structure with reference to FIGS. 1 to 4 is not intended for limiting the scope of this invention, but that variations or modifications may be made without departing from the scope and spirit of this invention. The following is a brief description of a few examples of such modifications:

(1) FIGS. 5 and 6 show modified forms of the air sealing portion. The air sealing piece 9 shown in FIG. 5 has a V-shaped cross-section, while the air sealing portion 10 shown in FIG. 6 has a hollow portion and is generally triangular in cross-section. Both the air sealing piece 9 and member 10 are comparable in performance to the air sealing piece 8 shown in FIG. 1.

(2) The air sealing portion does not necessarily need to contact the inner door panel over its full length, but it may be partially separated from the panel.

(3) The inner weather strip may alternatively be secured to the trim flange by clips or screws.

As many apparently widely different embodiments of this invention may be made without departing from the spirit and scope thereof, it is to be understood that the invention is not limited to the specific embodiments thereof except as defined in the appended claims.

What is claimed is:

1. A sealing structure in combination with a door, the sealing structure sealing an inner side of a door glass in the door, comprising:

a door trim having a downwardly extending trim flange adjacent the door glass;

an inner door panel disposed adjacent said door trim and spaced therefrom to define a clearance therebetween, the inner door panel having a downwardly extending panel flange spaced inwardly from said trim flange;

an inner weather strip attached to said door trim to form a seal between the door glass and said door trim; and an air sealing portion protruding from said inner weather strip and extending between said downwardly extending panel flange and said trim flange to control air flow through the clearance therebetween.

2. A combination as set forth in claim 1, wherein said air sealing portion is elastically flexible and a portion thereof extends beyond said trim flange.

3. A combination as set forth in claim 2, wherein said air sealing portion protrudes upwardly from said lower edge.

4. A combination as set forth in claim 3, wherein said air sealing portion has a U-shaped cross-section.

5. A combination as set forth in claim 3, wherein said air sealing portion has a V-shaped cross-section.

6. A combination as set forth in claim 1, wherein said air sealing portion has a hollow portion, is elastically flexible, and a portion of said air sealing portion extends beyond said trim flange.

7. A combination as set forth in claim 1, wherein said inner weather strip comprises:

an attachment portion constructed and arranged to attach said inner weather strip to said trim flange, a door glass sealing portion projecting from said attachment portion and constructed and arranged to contact said door glass, a cover lip portion projecting inwardly from said attachment portion and contacting and covering a portion of an upper surface of said door trim, and wherein said air sealing portion protrudes inwardly from a lower portion of said attachment portion and contacts said panel flange, and whereby said attachment portion, said door glass sealing portion, said cover lip portion and said air sealing portion one formed by extrusion molding.

8. A combination as set forth in claim 7, wherein said attachment portion, said door glass sealing portion, said cover lip portion and said air sealing portion are formed by extrusion molding from a synthetic resin.

9. A combination as set forth in claim 7, wherein said attachment portion, said door glass sealing portion, said cover lip portion and said air sealing portion are formed by extrusion molding from rubber.

* * * * *